US010967968B2

(12) United States Patent
Chung et al.

(10) Patent No.: US 10,967,968 B2
(45) Date of Patent: Apr. 6, 2021

(54) SYSTEM AND METHOD TO PROVIDE DESCENT RATE LIMITING FOR AN AIRCRAFT

(71) Applicant: Textron Innovations Inc., Fort Worth, TX (US)

(72) Inventors: Stephen Yibum Chung, Euless, TX (US); Eric Ricardo Gonzalez, Fort Worth, TX (US); Russell C. Peters, Fort Worth, TX (US); Matthew Edward Louis, Fort Worth, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 283 days.

(21) Appl. No.: 16/188,553

(22) Filed: Nov. 13, 2018

(65) Prior Publication Data

US 2020/0148346 A1 May 14, 2020

(51) Int. Cl.
*B64C 29/00* (2006.01)
*B64C 27/08* (2006.01)
*G05D 1/06* (2006.01)
*G05D 1/08* (2006.01)

(52) U.S. Cl.
CPC .......... *B64C 29/0033* (2013.01); *B64C 27/08* (2013.01); *G05D 1/0676* (2013.01); *G05D 1/0858* (2013.01)

(58) Field of Classification Search
CPC ................ B64C 29/0033; B64C 27/08; B60G 2400/0512; B63H 2003/006; G05D 1/0676; G05D 1/0858
See application file for complete search history.

(56) References Cited

U.S. PATENT DOCUMENTS

| 5,428,543 A | 6/1995 | Gold et al. |
| 2015/0232176 A1 | 8/2015 | Gillett et al. |
| 2016/0026190 A1 | 1/2016 | Kowalski et al. |
| 2016/0052626 A1 | 2/2016 | Mey |
| 2018/0002004 A1 | 1/2018 | Dekel et al. |

(Continued)

FOREIGN PATENT DOCUMENTS

| CN | 107310716 A | 11/2017 | |
| EP | 0127390 A2 * | 12/1984 | ........... G05D 1/0676 |

(Continued)

OTHER PUBLICATIONS

EPO Examination Report issued in EP Application 19196068.1 dated Feb. 27, 2020, 6 pages.

(Continued)

*Primary Examiner* — Geepy Pe
*Assistant Examiner* — Kle J Kingsland
(74) *Attorney, Agent, or Firm* — Patent Capital Group

(57) ABSTRACT

A method for an aircraft may include determining a transition from an airplane mode to a helicopter mode for a propulsion system of the aircraft, wherein the propulsion system comprises a plurality of rotor blades; determining whether a descent rate condition is satisfied, wherein the descent rate condition is associated with a maximum allowable descent rate for the aircraft; and controlling a collective pitch angle for the plurality of rotor blades based on the descent rate condition.

17 Claims, 6 Drawing Sheets

(56) References Cited

U.S. PATENT DOCUMENTS

2019/0351999 A1* 11/2019 Stamps .................. B64D 27/10

FOREIGN PATENT DOCUMENTS

GB          1003057 A     9/1965
WO     WO-2014045276 A1 *  3/2014   ............. G05D 1/102

OTHER PUBLICATIONS

EPO Examination Report issued in EP Application 19196068.1 dated Aug. 25, 2020, 6 pages.
EPO Search Report issued in EP Application 19196068.1 dated Feb. 11, 2020, 5 pages.
Youngshin Kang et al., "Development of flight control system and troubleshooting on flight test of a tilt-rotor unmanned aerial vehicle," International Journal of Aeronautical and Space Sciences 17.1 (Mar. 30, 2016): pp. 120-131, XP055657875, ISSN: 2093-274X, DOI: 10.5139/IJASS.2016.17.1.120; 12 pages.
EPO Examination Report issued in EP Application 19196068.1 dated May 20, 2020, 7 pages.
EPO Examination Report issued in EP Application 19196068.1 dated Jan. 11, 2021, 8 pages.

* cited by examiner

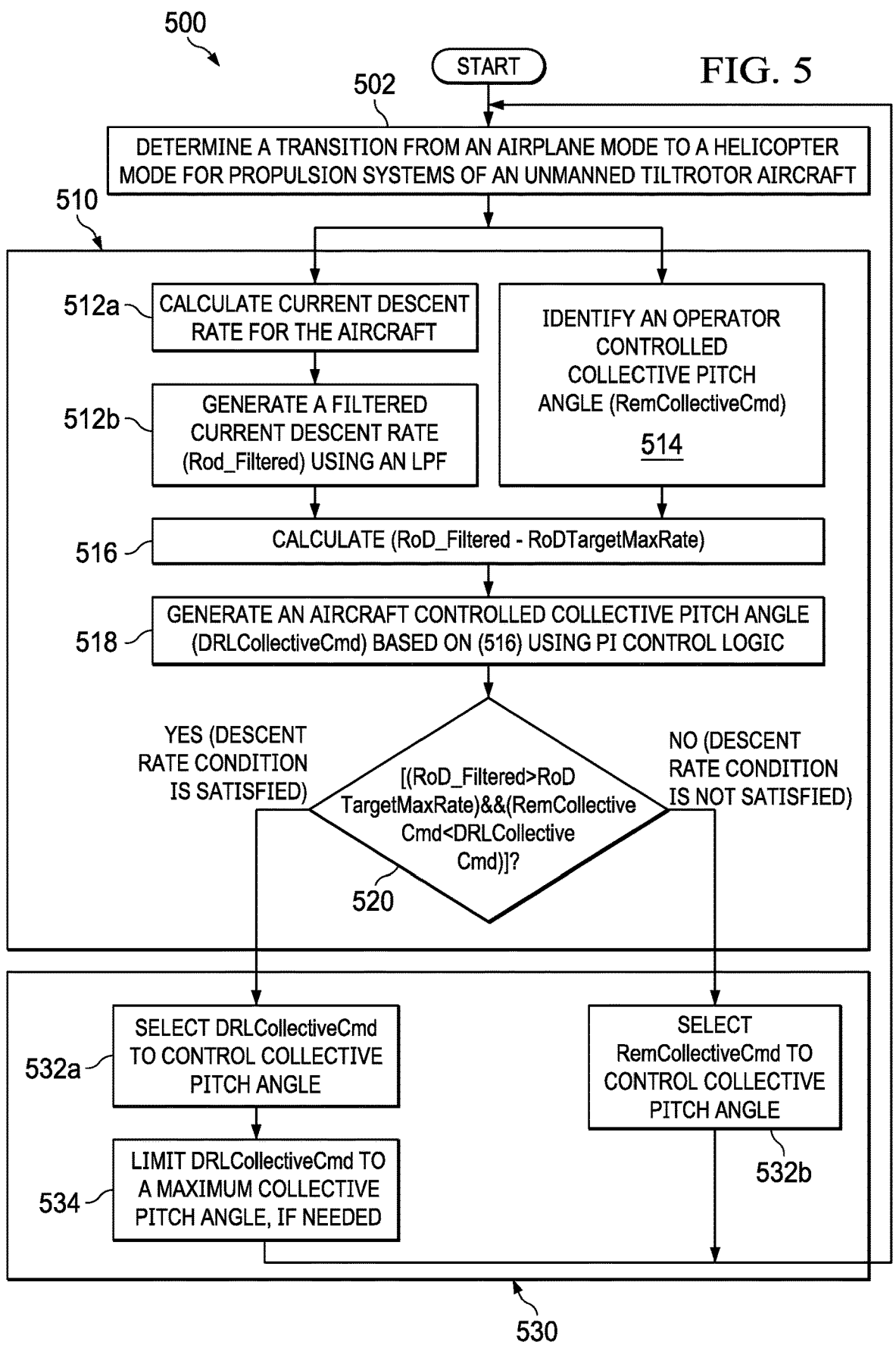

ional value based, at least in part, on the difference value; and calculating the aircraft controlled collective pitch angle based on a summation of the integration value and the proportional value. In at least one instance, the integration value may be set to the operator controlled collective pitch angle when the descent rate condition is not satisfied. In at least one instance, the method may include limiting the aircraft controlled collective pitch angle to a maximum aircraft controlled collective pitch angle.

SYSTEM AND METHOD TO PROVIDE DESCENT RATE LIMITING FOR AN AIRCRAFT

TECHNICAL FIELD

This disclosure relates in general to the field of aircraft and, more particularly, though not exclusively, to a system and method to provide descent rate limiting for an aircraft, in particular for an unmanned tiltrotor aircraft.

BACKGROUND

There are numerous considerations involved in the design of aircraft, such as unmanned tiltrotor aircraft, including size, weight, power efficiency, vibration, structural loads, and so forth. In particular, remote pilot control for unmanned aircraft can be limited by a lack of vestibular (e.g., spatial) and/or haptic (e.g., tactile) feedback provided to the pilot, which can result in loss of control and/or catastrophic failures, such as a crash, for such unmanned aircraft. Accordingly, flight control systems for unmanned aircraft can implicate numerous considerations and is often an extremely challenging aspect of designing aircraft systems.

SUMMARY

According to one aspect of the present disclosure, a method for an aircraft may be provided and may include determining a transition from an airplane mode to a helicopter mode for a propulsion system of the aircraft, wherein the propulsion system comprises a plurality of rotor blades; determining whether a descent rate condition is satisfied, wherein the descent rate condition is associated with a maximum allowable descent rate for the aircraft; and controlling a collective pitch angle for the plurality of rotor blades based on the descent rate condition.

The aircraft may be an unmanned aircraft in which the propulsion system further comprises a first proprotor comprising a plurality of rotor blades and at least one second proprotor comprises a plurality of rotor blades. In some cases, determining whether the descent rate condition is satisfied may further include: calculating a current descent rate for the aircraft based on altitude of the aircraft; identifying an operator controlled collective pitch angle for the plurality of rotor blades; comparing the operator controlled collective pitch angle for the plurality of rotor blades to an aircraft controlled collective pitch angle for the plurality of rotor blades; and comparing the current descent rate for the aircraft to the maximum allowable descent rate for the aircraft. In at least one instance, the descent rate condition may be satisfied when the operator controlled collective pitch angle is less than the aircraft controlled collective pitch angle and the current descent rate is greater than the maximum allowable descent rate.

In various instances, controlling the collective pitch angle for the plurality of rotor blades may further comprise: controlling the collective pitch angle for the plurality of rotor blades using the operator controlled collective pitch angle when the descent rate condition is not satisfied; and controlling the collective pitch angle for the plurality of rotor blades using the aircraft controlled collective pitch angle when the descent rate condition is satisfied.

In at least one instance, the method may further include calculating a difference value based on a difference between the current descent rate and the maximum allowable descent rate; calculating an integration value based, at least in part, on the difference value; calculating a proportional value based, at least in part, on the difference value; and calculating the aircraft controlled collective pitch angle based on a summation of the integration value and the proportional value. In at least one instance, the integration value may be set to the operator controlled collective pitch angle when the descent rate condition is not satisfied. In at least one instance, the method may include limiting the aircraft controlled collective pitch angle to a maximum aircraft controlled collective pitch angle.

According to another aspect of the present disclosure at least one non-transitory tangible media encoding logic that includes instructions for execution by a processor may be provided, wherein the execution causes the processor to perform operations, comprising: determining a transition from an airplane mode to a helicopter mode for a propulsion system of an aircraft, wherein the propulsion system comprises a plurality of rotor blades; determining whether a descent rate condition is satisfied, wherein the descent rate condition is associated with a maximum allowable descent rate for the aircraft; and controlling a collective pitch angle for the plurality of rotor blades based on the descent rate condition.

According to another aspect of the present disclosure, a flight control system for an unmanned tiltrotor aircraft may be provided and may include: at least one memory element for storing data; and at least one processor to execute instructions associated with the data, wherein the executing causes flight control system to perform operations, comprising: determining a transition from an airplane mode to a helicopter mode for a propulsion system of the aircraft, wherein the propulsion system comprises a plurality of rotor blades; determining whether a descent rate condition is satisfied, wherein the descent rate condition is associated with a maximum allowable descent rate for the aircraft; and controlling a collective pitch angle for the plurality of rotor blades based on the descent rate condition.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIGS. 4-5 are simplified flow diagrams illustrating example operations that may be associated with providing descent rate limiting control for an aircraft, in accordance with certain embodiments.

DETAILED DESCRIPTION

Figure 1A:
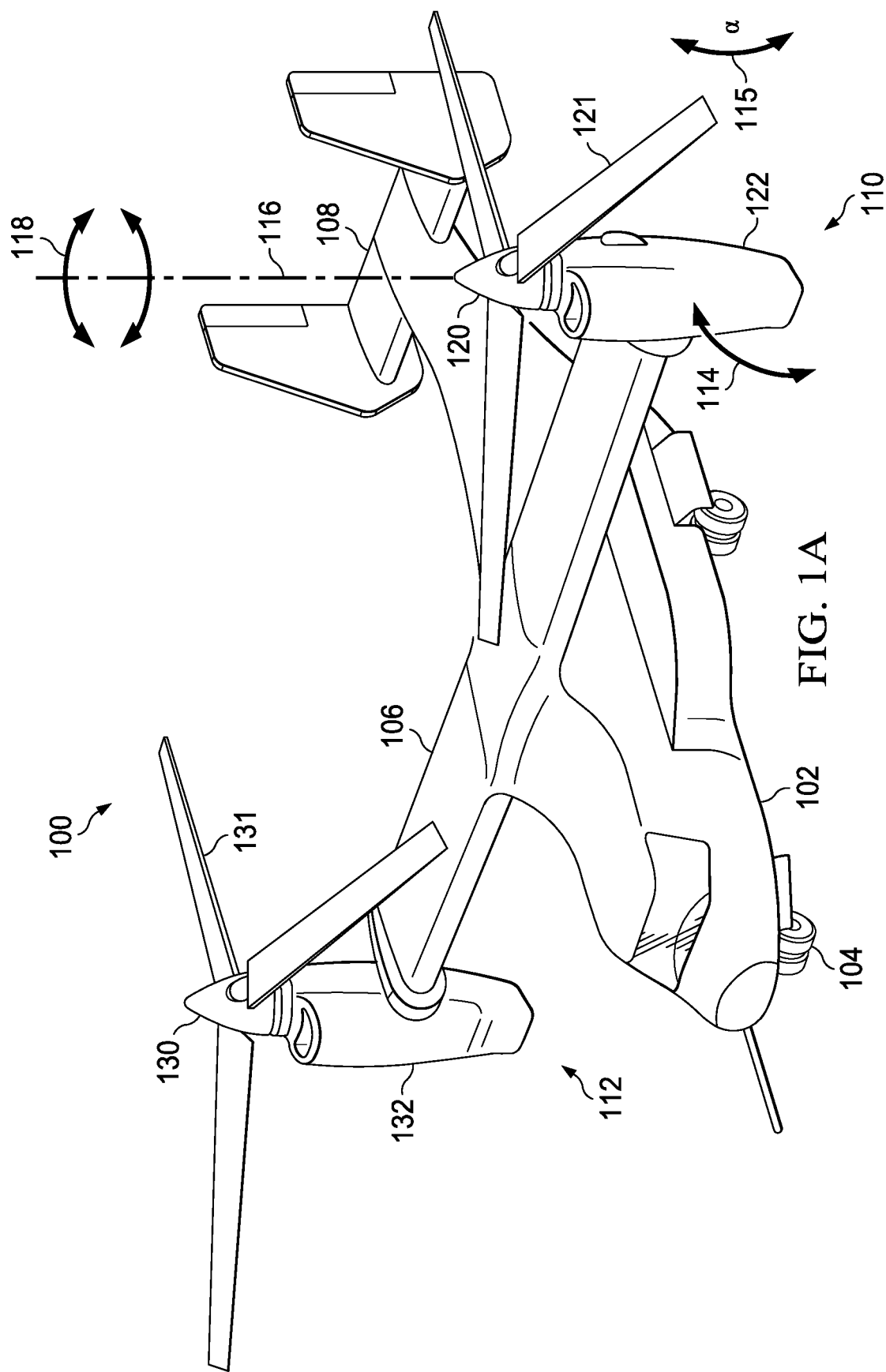
FIGS. 1A-1B are simplified diagrams of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect(s). The term 'inboard' may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term 'outboard' may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
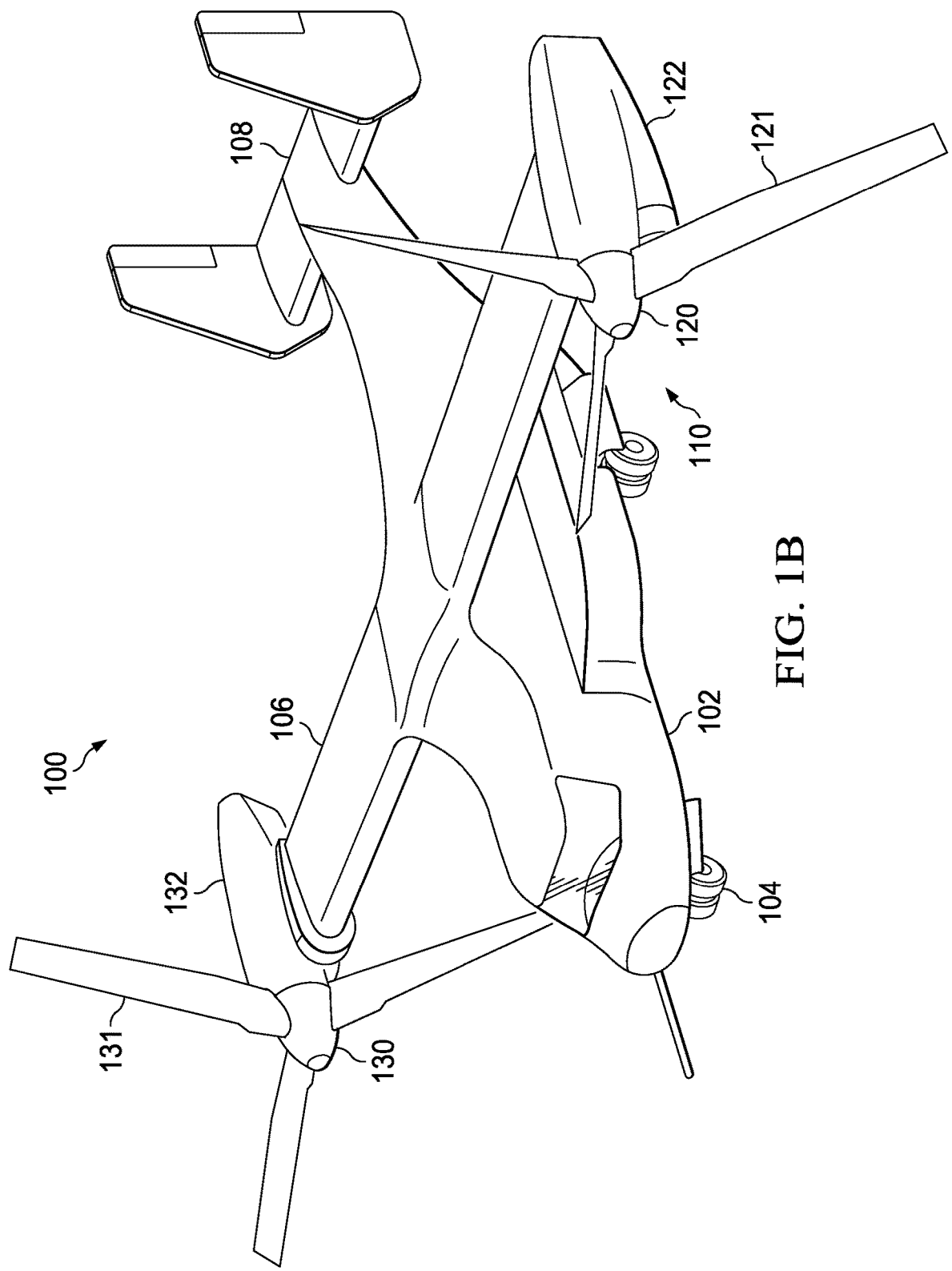

Referring to FIGS. 1A-1B, FIGS. 1A-1B illustrates an example embodiment of an example aircraft, which, in this example is an unmanned tiltrotor aircraft 100, in accordance with certain embodiments. FIG. 1 portrays a perspective view of unmanned tiltrotor aircraft 100. In at least one embodiment, unmanned tiltrotor aircraft 100 may include a fuselage 102, a landing gear 104, a wing 106, a tail member 108, a propulsion system 110, and a propulsion system 112. The fuselage 102 is the main body of unmanned tiltrotor aircraft 100, which may include a cabin (e.g., for cargo) and/or may house certain mechanical and electrical components for unmanned tiltrotor aircraft 100. In the illustrated embodiment, tail member 108 may be used as a vertical and a horizontal stabilizer.

Propulsion system 110 includes a proprotor 120 and a nacelle 122. Proprotor 120 includes a plurality of rotor blades 121. Propulsion 112 includes a proprotor 130 and a nacelle 132. Proprotor 130 includes a plurality of rotor blades 131. The position of proprotors 120 and 130, as well as the pitch of rotor blades 121 and 131, can be selectively controlled in order to provide flight capabilities (e.g., flight direction, thrust, and/or lift) for unmanned tiltrotor aircraft 100.

The position of proprotors 120 and 130 are rotatable (as generally indicated by arrows 114) between a helicopter mode position and an airplane mode position to provide different types of thrust for unmanned tiltrotor aircraft 100. FIG. 1A illustrates unmanned tiltrotor aircraft 100 proprotors 120 and 130 in a helicopter mode position in which proprotors 120 and 130 are positioned substantially vertical to provide a lifting thrust. For an airplane mode position, as illustrated in FIG. 1B, proprotors 120 and 130 can be positioned substantially horizontal to provide a forward thrust in which a lifting force is supplied by wing 106. It should be appreciated that tiltrotor aircraft can be operated such that proprotors 120 and 130 can be selectively positioned between airplane mode and helicopter mode positions, which can be referred to as a 'conversion mode', 'conversion mode positioning', or variations thereof.

Rotor blades 121 and 131 may be variable pitch rotor blades. The pitch angle of rotor blades 121 and 131 (generally represented by a pitch angle alpha ($\alpha$) indicated by arrows 115) can be managed and/or adjusted using collective control and/or cyclic control to selectively control direction, thrust, and/or lift of unmanned tiltrotor aircraft 100. During collective control, all of the rotor blades of a propulsion system are collectively pitched together (e.g., the pitch angle is the same for all blades). During cyclic control, the pitch angle of each of the rotor blades of a propulsion system is varied depending on where each blade is within a cycle of rotation (e.g., at some points in the rotation of rotor blades about the rotational axis of the rotor mast the pitch angle is not the same for all blades), which can effect direction of travel. A rotational axis (generally indicated by dashed lines 116) of the rotor mast associated with proprotor 120 of propulsion system 110 is illustrated in the embodiment of FIG. 1A in which rotor blades 121 can be rotated (as generally indicated by arrows 118) about the rotational axis 116 during operation of proprotor system 120. It is to be understood that proprotor 130 can be operated in a similar manner as proprotor 120.

In at least one embodiment, each respective propulsion system 110 and 112 may be driven by one or more motor(s) (e.g., within respective nacelles 122 and 132) to provide torque to respective proprotors 120 and 130 and to provide pitch control to respective rotor blades 121 and 131. In various embodiments, pitch control for rotor blades 121 and 131 may be provided using any combination of electromechanical and/or hydraulic rotary actuators, linear actuators, servomotors, servomechanisms, belt drive systems, gear systems, combinations thereof, or the like. As discussed for various embodiments described herein, motors may include electric motors, combustion motors, hydraulic motors, combinations thereof, or the like.

Unmanned tiltrotor aircraft 100 may include any components, systems, etc. (e.g., electrical, mechanical, electromechanical, etc.) that may enable flight control operations to be executed in-full or in-part by a remote operator/pilot, by a remote control system, by a flight control system provided for unmanned tiltrotor aircraft, or any combination thereof in accordance with embodiments described herein. As referred to herein, the terms 'operator' and 'pilot' may be used interchangeably.

When flying a tiltrotor aircraft (e.g., unmanned tiltrotor aircraft 100), the rotor power needed for level flight in helicopter mode increases when transitioning from forward flight (airplane mode) to a hover. This is due to a reduction in wing lift and increase in rotor induced power as air speed decreases. If the pilot does not add collective pitch during this maneuver, the tiltrotor aircraft is prone to entering a fast, undesired descent. This problem is further exacerbated on remotely piloted aircraft since there is no vestibular (e.g., spatial) or haptic (e.g., tactile) feedback provided to the remote pilot. By the time the remote pilot determines that the tiltrotor aircraft is descending, the corrective pilot response is often too late, which can result in loss of aircraft control, failure of aircraft components (e.g., due to sudden pilot overcorrections), and/or catastrophic failures such as crashes.

Figure 2:
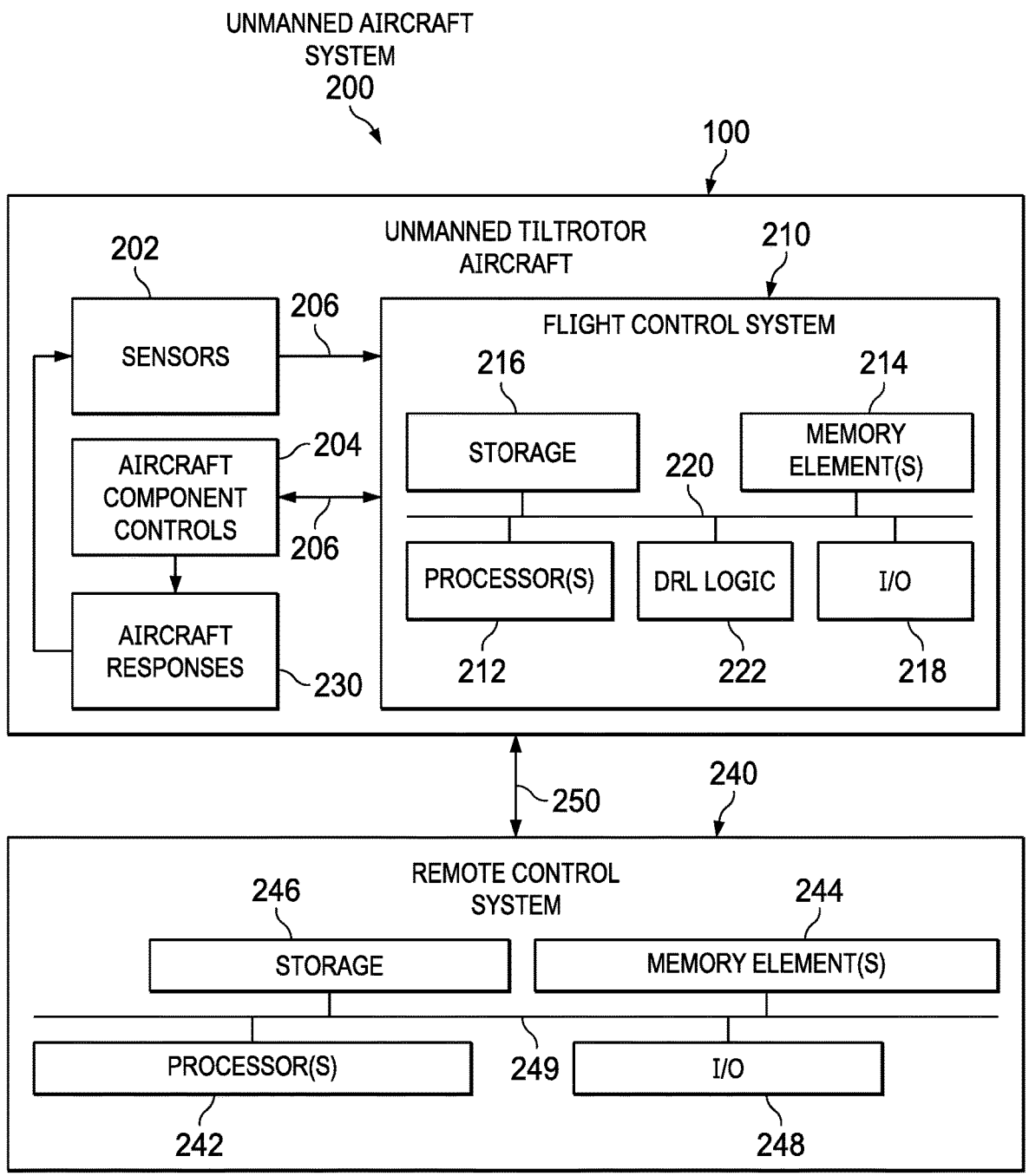
FIG. 2 is a simplified block diagram illustrating example details that may be associated with an unmanned aircraft system (UAS), in accordance with certain embodiments.

The present disclosure describes various embodiments for providing automatic descent rate limiting control for an unmanned tiltrotor aircraft (e.g., unmanned tiltrotor aircraft 100). In at least one embodiment, descent rate limiter (DRL) logic (e.g., DRL logic 222 as shown in FIG. 2) may be provisioned for a flight control system (e.g., flight control system 210 as shown in FIG. 2) of the unmanned tiltrotor aircraft to facilitate automatic descent rate limiting control for the unmanned tiltrotor aircraft. In at least one embodiment, the flight control system may provide for the ability to determine a transition from an airplane mode to a helicopter mode for the unmanned tiltrotor aircraft, to determine whether a descent rate condition is satisfied, and to control the collective pitch angle for the rotor blades based on whether the descent rate condition is satisfied. As referred to herein in this Specification, the terms 'unmanned tiltrotor aircraft', 'tiltrotor aircraft', and 'aircraft', may be used interchangeably.

The descent rate condition may be based on a comparison that includes: 1) comparing an operator controlled collective pitch angle for the rotor blades (e.g., as may be set by a remote operator or remote control system) to an aircraft controlled collective pitch angle for the rotor blades (e.g., as calculated by the DRL logic); and 2) comparing a current descent rate for the aircraft to a maximum allowable descent rate for the aircraft. The descent rate condition is satisfied when both the operator controlled collective pitch angle is less than the aircraft controlled collective pitch angle and the current descent rate is greater than the maximum allowable descent rate (e.g., the aircraft is descending too fast).

When the descent rate condition is satisfied, the DRL logic selects the collective pitch angle for the rotor blades to be the aircraft controlled collective pitch angle. Conversely, when the descent rate condition is not satisfied, the DRL logic selects the collective pitch angle for the rotor blades to be the operator controlled collective pitch angle.

Embodiments described throughout this disclosure that involve providing automatic descent rate limiting control for an unmanned tiltrotor aircraft may provide numerous technical advantages. During operation, the DRL logic may operate continuously to calculate the current descent rate for the aircraft and perform comparisons to determine whether the descent rate condition is met in order to automatically control the collective pitch using either the operator controlled collective or the aircraft controlled collective pitch angle in order to slow and/or stabilize the descent rate for the aircraft.

One advantage of embodiments described herein may include that the flight control system and DRL logic may provide automatic handoff between operator controlled collective and aircraft controlled collective, which may provide for smooth collective response by the aircraft (e.g., aircraft flight control response based on changes to collective pitch). It is important to provide a smooth collective response for an aircraft for changes between operator controlled collective and aircraft controlled collective in order to facilitate stable flight for the aircraft. Large changes in collective pitch angle can cause unstable flight conditions for the aircraft, can damage components of the aircraft, and/or can lead to catastrophic failures that may lead to crashes.

Another advantage of embodiments described herein may include that the flight control system and DRL logic may protect the aircraft from descending too fast during airplane mode to helicopter mode transitions, which may also protect the aircraft from entering an unrecoverable descent state (e.g., a vortex ring state) that could lead to a crash and/or may protect against overcorrections by remote operators, which could also lead to aircraft damage and/or a crash.

Example embodiments associated with providing automatic descent rate limiting control for unmanned tiltrotor aircraft are described below with more particular reference to the remaining FIGURES. It should be appreciated that example unmanned tiltrotor aircraft 100 of FIGS. 1A-1B is merely illustrative of a variety of aircraft in which a descent rate limiting control may be used in accordance with embodiments of the present disclosure. Other aircraft in which descent rate limiting control may be used can include, for example, fixed wing airplanes, hybrid aircraft, quadcopters, and multi-propulsion system aircraft among other examples.

Referring to FIG. 2, FIG. 2 is a simplified block diagram illustrating example details that may be associated with an unmanned aircraft system (UAS) 200 for unmanned tiltrotor aircraft 100, in accordance with certain embodiments. In at least one embodiment, unmanned aircraft system 200 may include unmanned tiltrotor aircraft 100 and a remote control system 240. Unmanned tiltrotor aircraft 100 may include sensors 202, aircraft component controls 204, and a flight control system 210. Flight control system 210 may include at least one processor(s) 212, at least one memory element(s) 214, storage 216, input/output (I/O) devices 218, and DRL logic 222. Flight control system 210 may also include one or more buses, such as a system bus and a memory bus, collectively represented in FIG. 2 by a bus 220, for enabling electronic communications between system components. Unmanned tiltrotor aircraft 100 may also include one or more communication links 206 for enabling communication between system components (e.g., between sensors 202 and flight control system 210, between aircraft component controls 204 and flight control system 210, etc.). In various embodiments, communication link(s) 206 can include wired (e.g., Ethernet) and/or wireless communication links (e.g., Radio Frequency (RF) communication, near field communication (NFC), Bluetooth™, etc.).

In various embodiments, sensors 202 may include global positioning system (GPS) sensors, altitude sensors, attitude sensors/indicators, torque sensors, airspeed sensors, revolutions per minute (RPM) sensors, battery system sensors, combinations thereof, or any other sensors that may facilitate flight control for unmanned tiltrotor aircraft. Aircraft component controls 204 (e.g., actuators, servomotors, motors, etc.) may facilitate aircraft responses 230 (e.g., collective pitch control, cyclic pitch control, etc.) for unmanned tiltrotor aircraft 100.

Remote control system 240 may include at least one processor(s) 242, at least one memory element(s) 244, storage 246, and I/O devices 248. Remote control system 240 may also include one or more buses, such as a system bus and a memory bus, collectively represented in FIG. 2 by a bus 249, for enabling electronic communications between system components. Remote control system 240 communicates with flight control system 210 via a communication link 250, which can include any combination of wired and/or wireless communication links.

In various embodiments, unmanned aircraft system 200 may include any network that facilitates communications between unmanned tiltrotor aircraft 100 and remote control system 240 in a network environment such as a local area network, a wide area network, the Internet, or any other type of network that enables communications between one or more network elements using any suitable communication technologies such as transmission control protocol/internet protocol, file transfer protocol, hypertext transfer protocol, internet protocol security protocol, point-to-point tunneling protocol, secure sockets layer protocol, combinations thereof, or the like.

At least one processor(s) 212 and 242 can be at least one hardware processor(s) that uses software, firmware, combinations thereof, or the like to execute operations. At least one memory element(s) 214 and 244, respectively, can store instructions that when executed cause respective processor(s) 212 and 242 to perform operations.

A processor (e.g., a hardware processor), which may also be referred to as a central processing unit (CPU), can include any general or special-purpose processor capable of executing any type of machine-readable instructions and performing operations on data as instructed by the machine-readable instructions. In one example, a processor [as shown in FIG. 2] can transform an element or an article (e.g., data, information) from one state or thing to another state or thing to implement one or more operations outlined herein. In another example, operations outlined herein may be implemented with logic (e.g., DRL logic 222), which can include fixed logic, hardware logic, programmable logic, digital logic, control logic, etc. (e.g., software/computer instructions executed by a processor) and/or one or more the elements identified herein could be some type of a programmable processor, programmable digital logic such as a field programmable gate array (FPGA), a digital signal processing (DSP) processor, an erasable programmable read only memory (EPROM), a controller, an electrically erasable PROM (EEPROM), or an application specific integrated circuit (ASIC) that includes digital logic, software, code, electronic instructions, or any suitable combination thereof to perform operations as described herein.

A memory element [as shown in FIG. 2] may be directly accessible by a hardware processor for accessing machine-readable instructions and may be in the form of random access memory (RAM) or any type of dynamic storage (e.g., dynamic random-access memory (DRAM)). In at least one embodiment, storage [e.g., storage 216 and 246 as shown in FIG. 2] may include non-volatile memory, such as read only memory (ROM), a hard disk, floppy disk, optical disk, or other drive that is capable of storing electronic data including executable software files, instructions. In some embodiments, externally stored electronic data may be provided to flight control system 210 and/or remote control system 240 through one or more removable media drives, which may be configured to receive any type of external media such as compact discs (CDs), digital video discs (DVDs), flash drives, external hard drives, etc.

As used herein, the term 'removable media drive' refers to a drive configured to receive any type of external computer-readable media. Instructions embodying activities, functions, operations, etc. described herein may be stored on one or more external and/or internal computer-readable media. Additionally, such instructions may also, or alternatively, reside at least partially within a memory element (e.g., in main memory or cache memory of processor(s) [as shown in FIG. 2] during execution, or within a non-volatile memory element(s) of unmanned aircraft system 200. Accordingly, other storage and/or memory element(s) of system 200 may also constitute computer-readable media. As referred to herein in this Specification, the term 'computer-readable medium' is meant to include any non-transitory tangible media and/or non-transitory computer-readable storage media (e.g., embedded logic provided in an ASIC, in DSP instructions, software [potentially inclusive of object code and source code], etc.) that is capable of storing instructions for execution by a system (e.g., by processor(s) 212, processor(s) 242, and/or DRL logic 222) that causes the system to perform any of one or more of the activities, functions, operations, etc. disclosed herein. Any of the memory items and/or storage options discussed herein may be included in the broad term 'memory element' as used herein.

In various embodiments, I/O devices 218 for unmanned tiltrotor aircraft 100 may include communication interface devices (e.g., transceivers, network interfaces, sensor interfaces, etc.) that may facilitate receiving inputs and/or generating flight control outputs (e.g., commands, signaling, messaging, etc.) for controlling unmanned tiltrotor aircraft 100. In some embodiments, I/O devices 218 may include displays that may provide user interfaces to allow a user to interact with flight control system 210. Such a user interface may include a display device such as a graphical display device (e.g., a liquid crystal display (LCD), a light emitting diode (LED) display, etc.). In various embodiments, I/O devices 218 may also include any appropriate input mechanism such as a keyboard, a touch screen, a mouse, a trackball, joystick(s), slider(s), trigger control(s), voice recognition, a touch pad, combinations thereof, or the like.

In some embodiments, inputs for flight control system 210 can be remote signals received by the aircraft from a ground-based pilot and/or system via remote control system 240. In various embodiments, I/O devices 248 for remote control system 240 may include communication interface devices (e.g., transceivers, network interfaces, sensor interfaces, etc.) that may facilitate receiving inputs and/or generating flight control outputs for controlling unmanned tiltrotor aircraft 100. In some embodiments, I/O devices 248 may include displays that may provide user interfaces to allow a ground-based pilot and/or system to interact with flight control system 210 via communication link 250. Such a user interface may include a display device such as a graphical display device. In various embodiments, I/O devices 218 may also include any appropriate input mechanism such as a keyboard, a touch screen, a mouse, a trackball, joystick(s), slider(s), trigger control(s), voice recognition, a touch pad, combinations thereof, or the like.

In at least one embodiment, flight control system 210 may be responsive to intended pilot inputs and/or other system inputs received via remote control system 240, may be responsive to flight control operations provided by processor(s) 212, and/or may also be responsive to flight control operations provided by DRL logic 222 in order to automatically provide descent limiting control for unmanned tiltrotor aircraft 100. Various operations that may be performed by DRL logic 222 to provide automatic descent rate limiting control for unmanned tiltrotor aircraft 100 are discussed in further detail with regard to FIG. 3, below.

Figure 3:
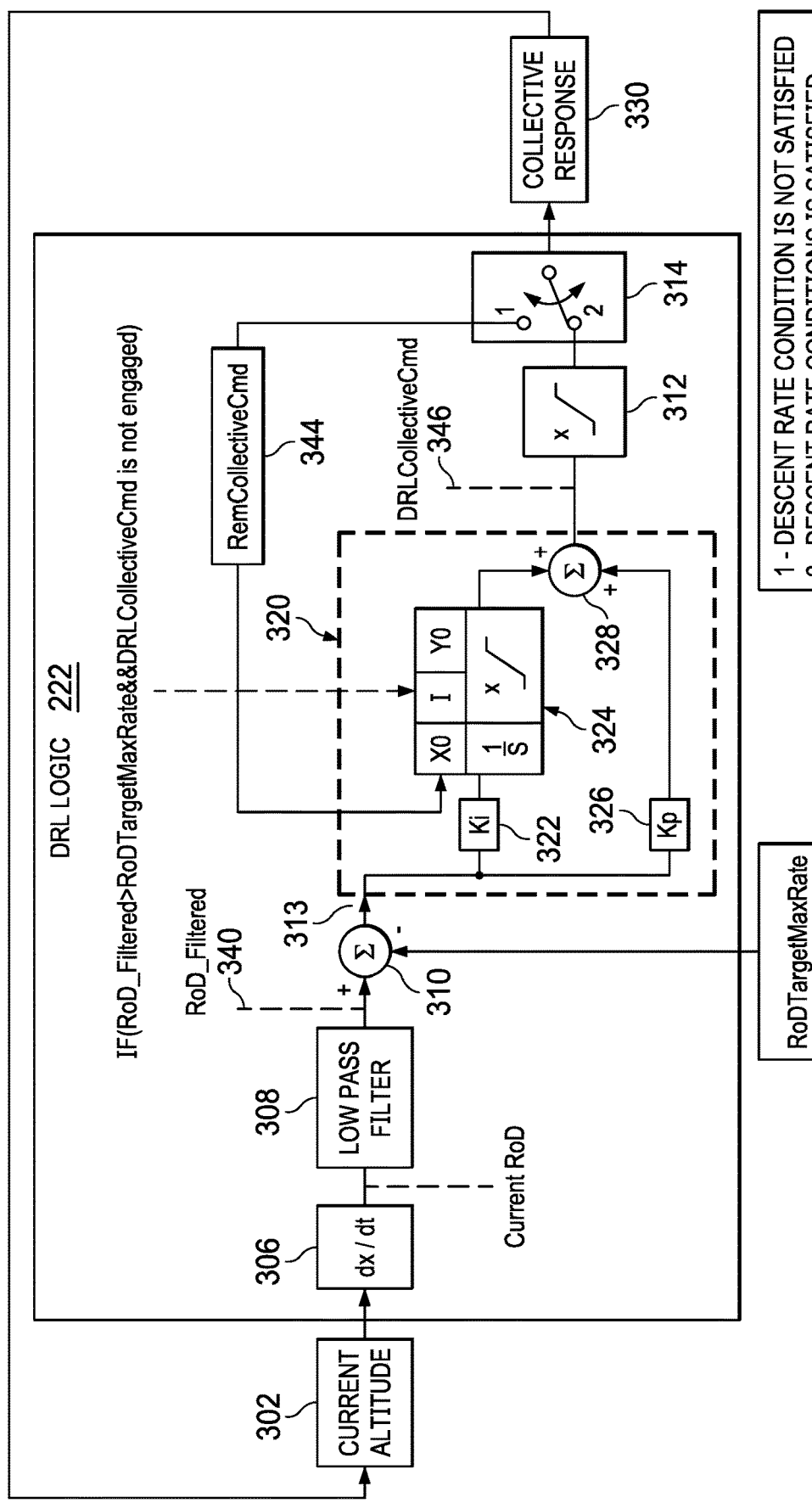
FIG. 3 is a simplified schematic diagram illustrating example operations that may be associated with descent rate limiter (DRL) logic of a flight control system, in accordance with certain embodiments.

Referring to FIG. 3, FIG. 3 is a simplified schematic diagram illustrating example operations that may be performed by DRL logic 222 to provide automatic descent rate limiting control for unmanned tiltrotor aircraft 100, in certain embodiments. As discussed in further detail below, in at least one embodiment DRL logic 222 can include instructions that, when executed (e.g., by processor(s) 212) causes flight control system 210 to perform operations which can include, but not be limited to: determining a transition from an airplane mode to a helicopter mode for propulsion systems 110 and 112 of the aircraft 100; determining whether a descent rate condition for the aircraft is satisfied; and controlling a collective pitch angle for respective rotor blades 121 and 131 of respective propulsion systems 110 and 112 based on the descent rate condition.

The descent rate condition is based on comparisons of several values including a filtered current rate of descent value (RoD_Filtered) 340 calculated for the aircraft by DRL logic 222, a Rate of Descent (RoD) target maximum rate parameter (RoDTargetMaxRate) 342 set for the aircraft, a remote collective pitch angle control command (RemCollectiveCmd) 344 received via remote control system 240, and an aircraft collective pitch angle control command (DRLCollectiveCmd) 346 calculated by DRL logic 222. The RoD_Filtered 340 is a value based on a current descent rate calculated for the aircraft that has been filtered to remove any high frequency noise. The RoDTargetMaxRate parameter 342 is an aircraft specific parameter that may be set (e.g., encoded in instructions) for DRL logic 222. The RemCollectiveCmd 344 is a collective pitch angle control command (in degrees, e.g., 10 degrees, etc.) that flight control system 210 receives from remote control system 240 based on aircraft control managed by a remote operator and/or system. The DRLCollectiveCmd 346 is an aircraft collective pitch angle control command (in degrees) for rotor blades 121 and 131 that is calculated by DRL logic 222.

Determining whether the descent rate condition is satisfied includes a comparison between the RoD_Filtered and the RoDTargetMaxRate and also a comparison between the RemCollectiveCmd and the DRLCollectiveCmd as follows: if [(RoD_Filtered>RoDTargetMaxRate) && (RemCollectiveCmd<DRLCollectiveCmd)], then the descent rate condition is satisfied and the collective response is controlled by the aircraft (e.g., using DRL logic 222) via the DRLCollectiveCmd (e.g., the DRLCollectiveCmd is 'engaged'). Otherwise, if (RoD_Filtered≤RODTargetCmd) or if (RemCollectiveCmd≥DRLCollectiveCmd) then the descent rate condition is not satisfied and the collective response is controlled by the remote operator and/or system via the RemCollectiveCmd (e.g., the DRLCollectiveCmd is 'not engaged').

In addition to instructions to perform various general purpose operations (e.g., calculations, filtering, limiting, etc.), DRL logic 222 may include instructions to perform operations using proportional-integral (PI) control logic 320 (also referred to as a 'PI control loop') and engagement logic 314. PI control logic 320 includes instructions associated with an integration constant (Ki) 322, an integrator 324, a proportional constant (Kp) 326, and a summing calculation 328 to calculate the DRLCollectiveCmd. Engagement logic 314 includes instructions that determine when the descent rate condition is satisfied based on the comparisons as discussed above.

When the descent rate condition is satisfied, the DRL logic 222 collective pitch angle control command DRLCollectiveCmd is 'engaged' to control a collective aircraft response 330 (e.g., a type of aircraft response 230, as discussed above) in order to limit the descent rate for the unmanned tiltrotor aircraft 100. For example, the DRLCollectiveCmd may cause the collective pitch angle for rotor blades 121 and 131 to be increased via aircraft component controls 204 when the aircraft is transitioning from an airplane mode to a helicopter mode and descending too fast. In at least one embodiment, the DRLCollectiveCmd can be limited (312) to a maximum pitch angle to limit large pitch angle adjustments for the aircraft, which can cause flight instability for the aircraft.

When the descent rate condition is not satisfied, the DRL logic 222 collective pitch angle control command is 'not engaged'; rather, the collective aircraft response 330 is in a fully manual mode and controlled via the remote control system 240 by a remote operator and/or system based on the RemCollectiveCmd received from remote control system 240 (e.g., based on inputs received via I/O devices 248).

Consider an operational example in which DRL logic 222 may receive inputs including a current altitude input 302 (e.g., received from one or more sensors 202) and RoDTargetMaxRate parameter 342. The units of RoDTargetMaxRate may be feet per second (fps). During operation, instructions provided for DRL logic 222 can calculate (306) a current RoD for the aircraft (e.g., change in altitude divided by change in time). The current RoD for the aircraft can be processed using a low pass filter (308) to filter any high frequency noise that may be present in the calculated current RoD in order to generate RoD_filtered. The DRL logic 222 calculates a difference (310) between the RoD_filtered and the RoDTargetMaxRate (e.g., RoD_filtered RoDTargetMaxRate).

The difference between the RoD_filtered and the RoDTargetMaxRate provides an input (313) to PI control logic 320. The input (313) is multiplied by Ki 322 and input to the integrator 324, which generates an integration output value that is input to the summing calculation 328. The input (313) is also multiplied by Kp 326 to generate a proportional output value that is input to the summing calculation 328. The output of the summing calculation 328 is the DRLCollectiveCmd. In some embodiments, PI control logic 320 may also include instructions associated with a derivative calculation (e.g., for a PID controller) in which the difference input is multiplied by a derivative constant and input to a derivative calculation. In such an embodiment, the output of the derivative calculation can also be input to the summing calculation to generate the DRLCollectiveCmd.

The units of Ki 322 may be degrees/fps/s and the units of Kp 326 may be degrees/fps. In various embodiments, Ki 322 and Kp 326 are aircraft specific parameters that can be set for PI control logic 320 based on modelling, simulation, flight testing, aircraft configuration (e.g., number of propulsion systems, aircraft aerodynamics, weight, etc.), aircraft component configuration (e.g., motor size/speed, rotor blade number/size/configuration, etc.), combinations thereof, or the like.

In at least one embodiment, integrator 324 may be configured to have a saturation limit, which may also be an aircraft specific parameter set for PI control logic 320. Integrator 324 may also be configured to include an initialization condition (I) such that the integrator 324 may be initialized to be equal to the RemCollectiveCmd when the initialization condition is satisfied. The initialization condition includes a comparison between the RoD_Filtered and the RoDTargetMaxRate and a determination of whether the DRLCollectiveCmd is engaged as follows: if [(RoD_Filtered>RoDTargetMaxRate) && (DRLCollectiveCmd is not engaged)], then initialize integrator 324 to begin integrating using the RemCollectiveCmd. The DRLCollectiveCmd is not engaged when the descent rate condition is not satisfied. The integrator 324 may be initialized to the RemCollectiveCmd for each clock cycle that the initialization condition is satisfied, which may facilitate smooth handoffs for collective pitch angle control for the aircraft between the RemCollectiveCmd and the DRLCollectiveCmd to limit sudden collective pitch angle changes during the handoffs.

Engagement logic 314 selects control for the collective response 330 to be either the RemCollectiveCmd when the descent rate condition is not satisfied (e.g., DRLCollectiveCmd is not engaged) or DRLCollectiveCmd when the descent rate condition is satisfied (e.g., DRLCollectiveCmd is engaged). The collective response 330 for the aircraft can cause change(s) in current altitude (302) for the unmanned tiltrotor aircraft 100. Based on current altitude (302) inputs, DRL logic 222 continues to calculate DRLCollectiveCmd and determines whether the descent rate condition is or is not satisfied to continuously select control for the collective response between the RemCollectiveCmd and the DRLCollectiveCmd. Following handover of collective control to the DRLCollectiveCmd, the operator and/or system may regain control of the aircraft by increasing the RemCollectiveCmd to be greater than or equal to the DRLCollectiveCmd or by the RoD_Filtered being less than or equal to the RoDTargetMaxRate (e.g., the descent rate of the aircraft has slowed to an acceptable rate).

Thus, DRL logic 222 facilitates automatic handoff between the RemCollectiveCmd and the DRLCollectiveCmd based on whether the descent rate condition is satisfied to provide seamless collective control for unmanned tiltrotor aircraft 100 to limit the descent rate for the aircraft. In particular, to limit the descent rate for the aircraft when propulsion systems 110 and 112 are transitioned from an airplane mode to a helicopter mode (e.g., for hovering and/or landing).

Figure 4:
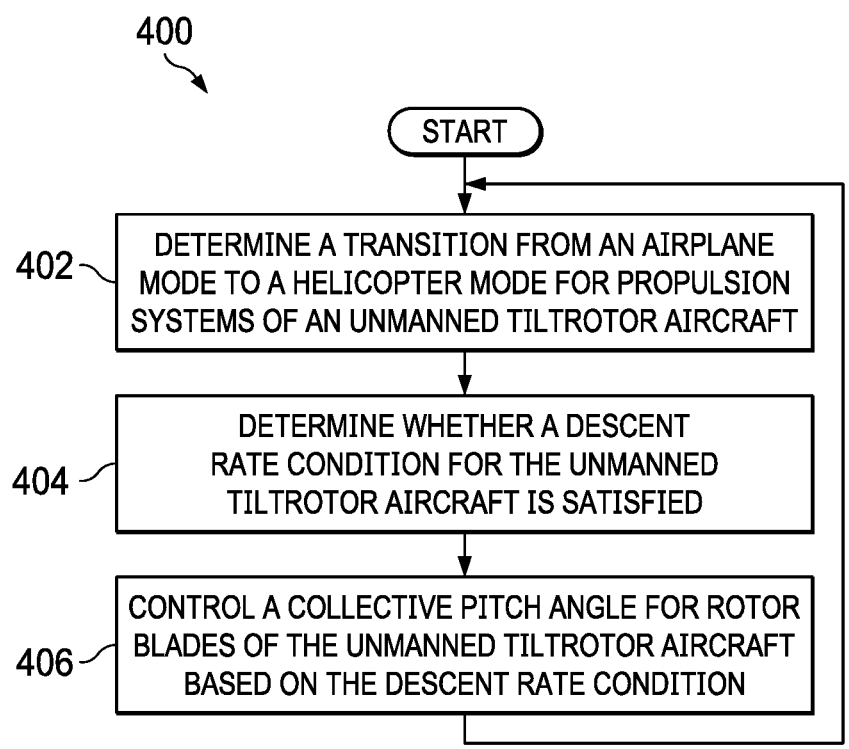

Referring to FIG. 4, FIG. 4 is a simplified flow diagram illustrating example operations 400 that may be associated with providing descent rate limiting control for an unmanned tiltrotor aircraft (e.g., unmanned tiltrotor aircraft 100), in certain embodiments. In at least one embodiment, operations 400 may be performed by flight control system 210 using any combination of processor(s) 212 and/or DRL logic 222 and/or any other system(s), processor(s), and/or logic that may be provided in an unmanned aircraft system such as unmanned aircraft system 200.

In at least one embodiment, operations 400 may begin at 402 by determining a transition from an airplane mode to a helicopter mode for propulsion systems of the unmanned tiltrotor aircraft. In various embodiments, the determination at 402 may be made based on one or more of: information received and/or retrieved from one or more sensors (e.g., sensors 202); flight control information processed via one or more processors (e.g., processor(s) 212 of flight control system 210); inputs and/or commands received from received from remote control system 240 (e.g., receiving commands from the remote control system to transition the propulsion systems from airplane mode to helicopter mode, to hover, etc.); combinations thereof; or any other suitable methods for determining a transition from an airplane mode to a helicopter mode. At 404, the operations include determining whether a descent rate condition for the unmanned tiltrotor aircraft is satisfied. At 406, the operations include controlling a collective pitch angle for a plurality of rotor blades of the propulsion systems based on the descent rate condition. The operations may return to 402 to continue control the collective pitch angle for rotor blades of the propulsion systems.

Referring to FIG. 5, FIG. 5 is a simplified flow diagram illustrating other example operations 500 that may be associated with providing descent rate limiting control for an unmanned tiltrotor aircraft (e.g., unmanned tiltrotor aircraft 100), in certain embodiments. In at least one embodiment, operations 500 may be performed by flight control system 210 using any combination of processor(s) 212 and/or DRL logic 222 and/or any other system(s), processor(s), and/or logic that may be provided in an unmanned aircraft system such as unmanned aircraft system 200.

In at least one embodiment, operations 500 may begin at 502 (e.g., similar to 402, as discussed for FIG. 4) by determining a transition from an airplane mode to a helicopter mode for propulsion systems of the unmanned tiltrotor aircraft. Operations 510 may be performed to determine whether a descent rate condition for the unmanned tiltrotor aircraft is satisfied. Operations 530 may be performed to control a collective pitch angle for a plurality of rotor blades of the propulsion systems of the unmanned tiltrotor aircraft.

In at least one embodiment, operations 510 may include calculating a current descent rate for the aircraft based on altitude of the aircraft at 512a. At 512b, a filtered current descent rate (e.g., RoD_Filtered) is generated using a low pass filter (LPF). At 514, a remote (e.g., operator) controlled collective pitch angle is identified (e.g., RemCollectiveCmd, as received from remote control system 240). At 516, a difference between RoD_Filtered and a maximum allowable descent rate for the aircraft (RoDTargetMaxRate) is calculated. At 518, an aircraft controlled collective pitch angle (e.g., DRLCollectiveCmd, as generated by DRL logic 222) is generated using PI control logic based on the result of the difference calculation (516).

At 520, comparisons are performed to determine whether RoD_Filtered is less than a maximum allowable descent rate for the aircraft (e.g., RoDTargetMaxRate) and whether the RemCollectiveCmd is less than an aircraft controlled collective pitch angle (e.g., DRLCollectiveCmd, as generated by DRL logic 222) to determine whether the descent rate condition is satisfied.

If both [(RoD_Filtered>RoDTargetMaxRate) and (RemCollectiveCmd<DRLCollectiveCmd)], then the descent rate condition is satisfied and the operations include selecting (532a) the aircraft controlled collective pitch angle (DRLCollectiveCmd) to control the collective pitch angle for rotor blades 121 and 131 of the aircraft. The DRLCollectiveCmd can be limited (534) to a maximum collective pitch angle if, for example, the DRLCollectiveCmd as generated by the DRL logic 222 exceeds the maximum collective pitch angle; otherwise, the DRLCollectiveCmd is used to control the collective pitch angle for rotor blades 121 and 131 and the operations return to 502 to continue control the collective pitch angle for the rotor blades of the propulsion systems. If either [(RoD_Filtered≤RoDTargetMaxRate) or (RemCollectiveCmd≥DRLCollectiveCmd)], then the descent rate condition is not satisfied and the operations include selecting (532b) the remote controlled collective pitch angle (RemCollectiveCmd) to control the collective pitch angle for rotor blades 121 and 131 of the aircraft and the operations return to 502 to continue to control the collective pitch angle for the rotor blades of the propulsion systems.

The flows and diagrams in the FIGURES illustrate the architecture, functionality, and/or operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a control loop, controls, logic or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, or any other executable modules.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for an aircraft, comprising:
    determining a transition from an airplane mode to a helicopter mode for a propulsion system of the aircraft, wherein the propulsion system comprises a plurality of rotor blades;
    determining whether a descent rate condition is satisfied, wherein the descent rate condition is associated with a maximum allowable descent rate for the aircraft; and
    controlling a collective pitch angle for the plurality of rotor blades based on the descent rate condition;
    wherein determining whether the descent rate condition is satisfied further comprises:
        calculating a current descent rate for the aircraft based on altitude of the aircraft;
        identifying an operator controlled collective pitch angle for the plurality of rotor blades;
        comparing the operator controlled collective pitch angle for the plurality of rotor blades to an aircraft controlled collective pitch angle for the plurality of rotor blades; and
        comparing the current descent rate for the aircraft to the maximum allowable descent rate for the aircraft.

2. The method of claim 1, wherein the aircraft is an unmanned aircraft and the propulsion system further comprises a first proprotor comprising a plurality of rotor blades and at least one second proprotor comprises a plurality of rotor blades.

3. The method of claim 1, wherein the descent rate condition is satisfied when the operator controlled collective pitch angle is less than the aircraft controlled collective pitch angle and the current descent rate is greater than the maximum allowable descent rate.

4. The method of claim 3, wherein controlling the collective pitch angle for the plurality of rotor blades further comprises:

controlling the collective pitch angle for the plurality of rotor blades using the operator controlled collective pitch angle when the descent rate condition is not satisfied; and controlling the collective pitch angle for the plurality of rotor blades using the aircraft controlled collective pitch angle when the descent rate condition is satisfied.

5. The method of claim 3, further comprising:

calculating a difference value based on a difference between the current descent rate and the maximum allowable descent rate;

calculating an integration value based, at least in part, on the difference value;

calculating a proportional value based, at least in part, on the difference value; and calculating the aircraft controlled collective pitch angle based on a summation of the integration value and the proportional value.

6. The method of claim 5, further comprising:

setting the integration value to the operator controlled collective pitch angle when the descent rate condition is not satisfied.

7. The method of claim 5, further comprising:

limiting the aircraft controlled collective pitch angle to a maximum aircraft controlled collective pitch angle.

8. At least one non-transitory tangible media encoding logic that includes instructions for execution by a processor, wherein the execution causes the processor to perform operations, comprising:

determining a transition from an airplane mode to a helicopter mode for a propulsion system of an aircraft, wherein the propulsion system comprises a plurality of rotor blades;

determining whether a descent rate condition is satisfied, wherein the descent rate condition is associated with a maximum allowable descent rate for the aircraft; and controlling a collective pitch angle for the plurality of rotor blades based on the descent rate condition;

wherein determining whether the descent rate condition is satisfied further comprises:

calculating a current descent rate for the aircraft based on altitude of the aircraft;

identifying an operator controlled collective pitch angle for the plurality of rotor blades;

comparing the operator controlled collective pitch angle for the plurality of rotor blades to an aircraft controlled collective pitch angle for the plurality of rotor blades; and comparing the current descent rate for the aircraft to the maximum allowable descent rate for the aircraft.

9. The media of claim 8, wherein the descent rate condition is satisfied when the operator controlled collective pitch angle is less than the aircraft controlled collective pitch angle and the current descent rate is greater than the maximum allowable descent rate.

10. The media of claim 9, wherein controlling the collective pitch angle for the plurality of rotor blades further comprises:

controlling the collective pitch angle for the plurality of rotor blades using the operator controlled collective pitch angle when the descent rate condition is not satisfied; and controlling the collective pitch angle for the plurality of rotor blades using the aircraft controlled collective pitch angle when the descent rate condition is satisfied.

11. The media of claim 9, wherein the execution causes the processor to perform further operations, comprising:

calculating a difference value based on a difference between the current descent rate and the maximum allowable descent rate;

calculating an integration value based, at least in part, on the difference value;

calculating a proportional value based, at least in part, on the difference value; and calculating the aircraft controlled collective pitch angle based on a summation of the integration value and the proportional value.

12. The media of claim 11, wherein the execution causes the processor to perform further operations, comprising:

setting the integration value to the operator controlled collective pitch angle when the descent rate condition is not satisfied.

13. The media of claim 11, wherein the execution causes the processor to perform further operations, comprising:

limiting the aircraft controlled collective pitch angle to a maximum aircraft controlled collective pitch angle.

14. A flight control system for an unmanned tiltrotor aircraft, comprising:

at least one memory element for storing data; and at least one processor to execute instructions associated with the data, wherein the executing causes flight control system to perform operations, comprising:

determining a transition from an airplane mode to a helicopter mode for a propulsion system of the aircraft, wherein the propulsion system comprises a plurality of rotor blades;

determining whether a descent rate condition is satisfied, wherein the descent rate condition is associated with a maximum allowable descent rate for the aircraft; and controlling a collective pitch angle for the plurality of rotor blades based on the descent rate condition;

wherein determining whether the descent rate condition is satisfied further comprises:

calculating a current descent rate for the aircraft based on altitude of the aircraft;

identifying an operator controlled collective pitch angle for the plurality of rotor blades;

comparing the operator controlled collective pitch angle for the plurality of rotor blades to an aircraft controlled collective pitch angle for the plurality of rotor blades; and comparing the current descent rate for the aircraft to the maximum allowable descent rate for the aircraft.

15. The flight control system of claim 14, wherein the descent rate condition is satisfied when the operator controlled collective pitch angle is less than the aircraft controlled collective pitch angle and the current descent rate is greater than the maximum allowable descent rate.

16. The flight control system of claim 15, wherein controlling the collective pitch angle for the plurality of rotor blades further comprises:

controlling the collective pitch angle for the plurality of rotor blades using the operator controlled collective pitch angle when the descent rate condition is not satisfied; and controlling the collective pitch angle for the plurality of rotor blades using the aircraft controlled collective pitch angle when the descent rate condition is satisfied.

17. The flight control system of claim 15, wherein the executing causes the flight control system to perform further operations, comprising:

calculating a difference value based on a difference between the current descent rate and the maximum allowable descent rate;
calculating an integration value based, at least in part, on the difference value;
calculating a proportional value based, at least in part, on the difference value; and
calculating the aircraft controlled collective pitch angle based on a summation of the integration value and the proportional value.

* * * * *